(12) United States Patent
Matsumoto

(10) Patent No.: US 7,586,533 B2
(45) Date of Patent: Sep. 8, 2009

(54) IMAGE PROCESSING APPARATUS, IMAGE PROCESSING METHOD, PROGRAM, AND STORAGE MEDIUM

(75) Inventor: Shinichi Matsumoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 437 days.

(21) Appl. No.: 10/241,634

(22) Filed: Sep. 12, 2002

(65) Prior Publication Data

US 2003/0052986 A1 Mar. 20, 2003

(30) Foreign Application Priority Data

Sep. 17, 2001 (JP) ............................. 2001-282105

(51) Int. Cl.
*H04N 5/222* (2006.01)
*H04N 5/781* (2006.01)
(52) U.S. Cl. .................... 348/333.05; 386/95
(58) Field of Classification Search ................ 348/333, 348/231, 333.02, 232, 220, 552, 222, 241, 348/333.11, 207; 382/234, 240, 244, 232, 382/247, 260, 233, 248, 263, 264, 276; 386/95, 386/125

See application file for complete search history.

(56) References Cited

U.S. PATENT DOCUMENTS

| | | | |
|---|---|---|---|
| 5,903,309 A * | 5/1999 | Anderson | 348/333.02 |
| 6,246,797 B1 * | 6/2001 | Castor et al. | 382/232 |
| 6,431,768 B1 * | 8/2002 | Nakamura | 396/348 |
| 6,683,649 B1 * | 1/2004 | Anderson | 348/333.05 |
| 2001/0028787 A1 * | 10/2001 | Nomura et al. | 386/69 |
| 2002/0003576 A1 * | 1/2002 | Konishi et al. | 348/232 |
| 2002/0021359 A1 * | 2/2002 | Okamoto | 348/222 |
| 2002/0054157 A1 * | 5/2002 | Hayashi et al. | 345/838 |
| 2002/0154226 A1 * | 10/2002 | Gohda | 348/231.3 |
| 2002/0171747 A1 * | 11/2002 | Niikawa et al. | 348/333 |
| 2004/0201737 A1 * | 10/2004 | Baron et al. | 348/231 |
| 2004/0264937 A1 * | 12/2004 | Takahashi et al. | 386/95 |

FOREIGN PATENT DOCUMENTS

| JP | 7-23322 | 1/1995 |
|---|---|---|
| JP | 02001186456 | * 7/2001 |

\* cited by examiner

*Primary Examiner*—Behrooz Senfi
(74) *Attorney, Agent, or Firm*—Fitzpatrick, Cella, Harper & Scinto

(57) ABSTRACT

When a switch is not pressed, fetched image data for one frame undergoes an MPEG compression process, and the compressed image data is temporarily stored in a buffer. When the switch is pressed, fetched image data for one frame undergoes a JPEG compression process, and image data for the next and subsequent frames undergo an MPEG compression process and are additionally stored at the end position of the buffer. If a timer has reached a time-out, a JPEG file is generated based on JPEG-compressed data, and an MPEG file is generated based on MPEG-compressed data for a plurality of frames stored in the buffer.

19 Claims, 10 Drawing Sheets

FIG. 10

| STILL IMAGE DATA FILE | MOVING IMAGE DATA FILE |
|---|---|
| 01s.jpg | 01d.mpg |
| 02s.jpg | 02d.mpg |
| ⋮ | ⋮ |

IMAGE PROCESSING APPARATUS, IMAGE PROCESSING METHOD, PROGRAM, AND STORAGE MEDIUM

FIELD OF THE INVENTION

The present invention relates to an image processing apparatus for capturing a moving image or playing back a still image and/or a moving image, an image processing method, a program, and a storage medium.

BACKGROUND OF THE INVENTION

Some digital cameras that take still images have a moving image capture function using the motion JPEG format. On the other hand, some digital video cameras have a function of capturing a still image at an arbitrary timing during capture of a moving image. Using the cameras with such functions, a still image and moving image can be selectively captured according to a scene or purpose of capture, and the user can select a captured data format according to his or her favor.

However, the capture function in the digital cameras cannot record a still image and moving image at the same time, since it is executed after either the still or moving image capture mode is uniquely selected. Also, recording media used in the digital cameras are mainly semiconductor memory cards such as Compact Flash cards (to be referred to as CF cards hereinafter), Smart Media cards (to be referred to as SM cards hereinafter), and the like, have limited recording capacities, and are expensive. Therefore, upon capturing a moving image by motion-JPEG, it is difficult to record data for a long period of time or to record a plurality of moving image data.

The digital video camera can capture a still image at an arbitrary timing during capture of a moving image. In such case, moving image data is recorded on a tape medium as stream data, and still image data is saved on a tape or another recording medium. When still images are recorded on the tape, recorded moving image data is disrupted during the time band of captured still images. When still images are saved in another recording medium, since different recording media are used, it is not easy to associate the moving image and still images with each other later.

The present invention has been made in consideration of the aforementioned problems, and has as its object to provide an image processing apparatus and method, which capture a still image and a moving image for several frames before and after the still image, and hold the captured still and moving images in association with each other.

It is another object of the present invention to provide an image processing apparatus and method, which play back and display a captured still image and a moving image for several frames before and after the still image.

SUMMARY OF THE INVENTION

According to the present invention, an image processing apparatus comprises: input means for inputting moving image data formed by successive frame images; designation means for designating a desired frame image from the moving image data input by the input means; thumbnail image generation means for generating a thumbnail image of the frame image designated by the designation means; and storage means for storing the moving image data, image data of the frame image designated by the designation means, and image data of the thumbnail image generated by the thumbnail image generation means in association with each other.

According to the present invention an image processing apparatus for playing back a still image and/or a moving image, comprises: storage means for storing at least one or more still images, thumbnail images corresponding to the still images, and a moving image corresponding to one of the still images; display means for displaying a list of the thumbnail images; and selection means for selecting one of the thumbnail images displayed on the display means, wherein the display means selects a still image corresponding to the thumbnail image selected by the selection means from the storage means and displays the select still image, and when a moving image corresponding to that still image is stored in the storage means, the display means plays back and displays the moving image.

Furthermore, according to the present invention, an image processing method comprises the steps of: inputting moving image data formed by successive frame images; designating a desired frame image from the moving image data input in the input step; generating a thumbnail image of the frame image designated in the designation step; and storing the moving image data, image data of the frame image designated in the designation step, and image data of the thumbnail image generated in the thumbnail image generation step in association with each other.

Further, an image processing method for playing back a still image and/or a moving image, comprises the steps of: storing at least one or more still images, thumbnail images corresponding to the still images, and a moving image corresponding to one of the still images in predetermined storage means; displaying a list of the thumbnail images; and selecting one of the thumbnail images displayed in the display step, wherein the display step includes the step of selecting a still image corresponding to the thumbnail image selected in the selection step from the storage means and displaying the selected image, and playing back and displaying a moving image corresponding to that still image when the moving image is stored in the storage means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 shows the format of a management file according to the fifth embodiment of the present invention.

DETAILED DESCRIPTION OF THE PREFERRED EMBODIMENTS

Preferred embodiments of the present invention will now be described in detail in accordance with the accompanying drawings.

First Embodiment

This embodiment will explain an image processing apparatus which has a camera module that can capture a still image and moving image, and can store captured still image data as JPEG compressed data, and captured moving image data as MPEG4 compressed data.

Figure 1:
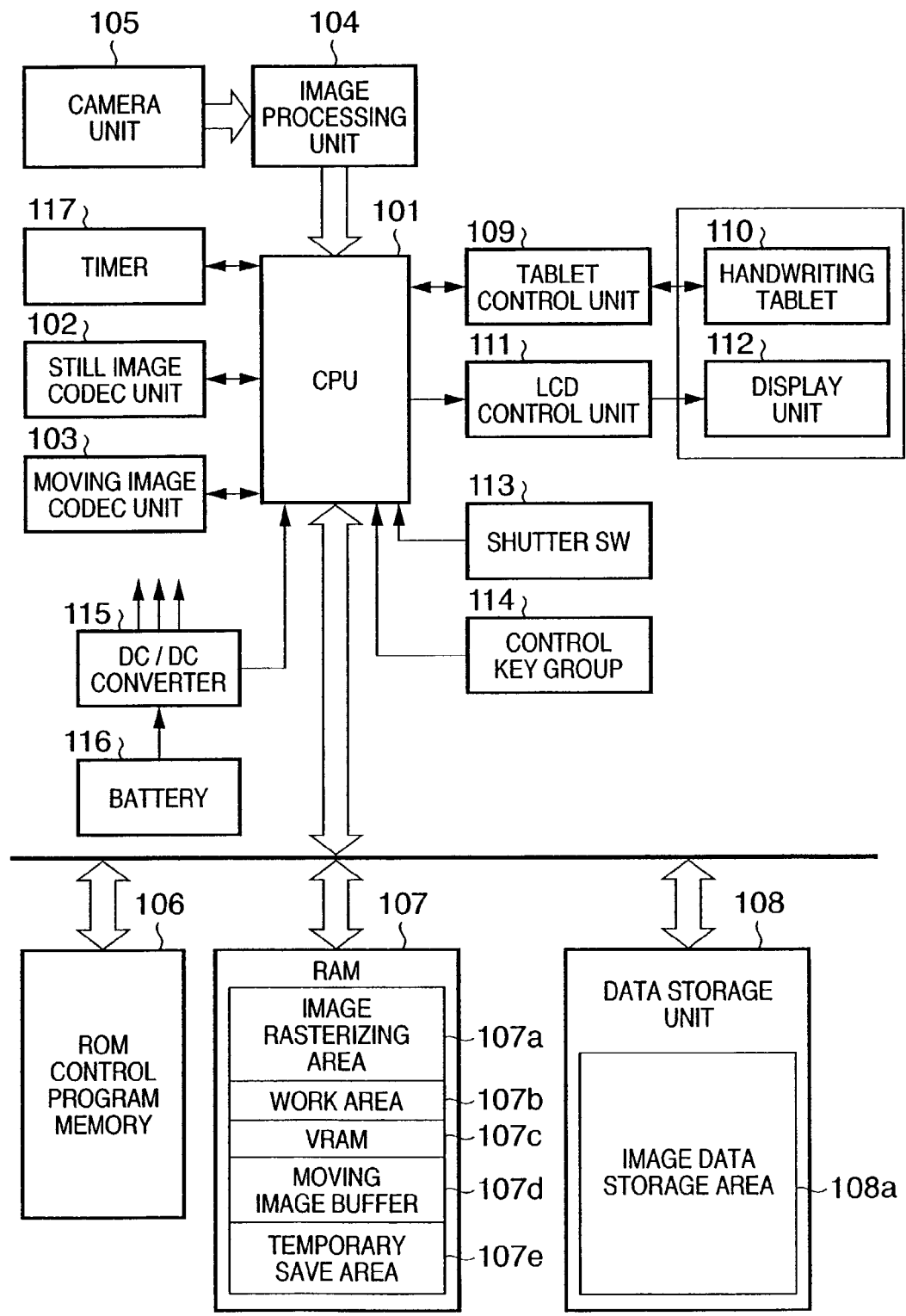
FIG. 1 is a block diagram showing the basic arrangement of an image processing apparatus according to the first embodiment of the present invention.

FIG. 1 is a block diagram showing the basic arrangement of an image processing apparatus of this embodiment. Referring to FIG. 1, reference numeral 101 denotes a CPU (central processing unit). The operation of the image processing apparatus of this embodiment is controlled by the CPU 101. To the CPU 101, a still image codec unit 102, moving image codec unit 103, image processing unit 104, ROM (read-only memory) 106 that stores a control program to be described later, RAM (random-access memory) 107, data storage unit 108, tablet control unit 109, LCD control unit 111, shutter SW 113, control key group 114, DC/DC converter 115 used to supply electric power, and timer 117 are connected.

A camera unit 105 is connected to the image processing unit 104, a handwriting tablet 110 to the tablet control unit 109, and a display unit (a display screen of such as a TFT color liquid crystal or the like and its drive unit) 112 to the LCD control unit 111. The DC/DC converter 115 receives electric power from a battery 116. The display unit 112 and handwriting tablet 110 have an integrated structure obtained by laminating a transparent tablet 110 on the display unit 112. When the user touches a corresponding position with a pen with reference to graphic data displayed on the display unit 112, he or she can make various control operations to be described later.

The CPU 101 executes various kinds of control based on the control program in the ROM 106. Such control includes:

a process for loading captured image signals of moving and still images output from the image processing unit 104, and DMA-transferring them to the RAM 107;

a process for DMA-transferring moving and still image data from the RAM 107 to the LCD control unit;

a process for compressing image data sent from the image processing unit 104 by JPEG or MPEG, and storing the compressed data in the data storage unit 108 in a file format;

a process for driving the still image codec unit 102 and moving image codec unit 103 to execute the JPEG and MPEG compression processes;

execution of various applications according to information input from the handwriting tablet 110;

instruction of a capture operation upon operation of the shutter SW 113;

execution of a corresponding control process in response to a control instruction using the control key group 114 during execution of a given application; and a process for outputting a control signal for controlling power supply to respective elements to the DC/DC converter 115.

The RAM 107 comprises an image rasterizing area 107*a*, work area 107*b*, VRAM 107*c*, moving image buffer 107*d*, and temporary save area 107*e*. The image rasterizing area 107*a* is used as a temporary buffer for temporarily storing some of a captured image (YUV digital signal) continuously sent from the image processing unit 104 or JPEG and MPEG compressed image data read out from the data storage unit 108, or as an image-dedicated work area for image compression and expansion processes. The work area 107*b* is that for various programs, and is used by various application programs executed by the CPU 101. The VRAM 107*c* is used as that for storing display data to be displayed on the display unit 112. The moving image buffer 107*d* is an area for temporarily storing frame data for only a predetermined period of time, which have undergone moving image compression by the moving image codec 103. The temporary save area 107*e* is an area for temporarily storing various data.

The data storage unit 108 is used as an image data storage area 108*a* which stores JPEG-compressed captured still image data, MPEG-compressed captured moving image data, files of, e.g., various additional data to be referred to by applications, folders, and the like. In this embodiment, a flash memory is used as the data storage unit 108, but the present invention is not limited to such specific memory.

The camera unit 105 includes a lens group, CCD, CCD control unit, and the like. The lens group is formed of a plurality of lenses for optically projecting an object image onto the CCD, which is an element for converting an image to be captured projected by the lens group into an analog electrical signal. The CCD control unit includes a timing generator for supplying a transfer clock signal and shutter signal to the CCD, a circuit for executing noise removal and a gain process of a CCD output signal, an A/D conversion circuit for converting an analog signal into 10-bit digital signals, and the like.

The image processing unit 104 executes gamma conversion, color space conversion, and image processes such as white balance, AE, flash correction, and the like of the 10-bit digital signals output from the camera unit 105, and outputs 8-bit digital signals in a YUV (4:2:2) or YUV (4:2:0) format.

The still image codec unit 102 includes a JPEG encoder for generating JPEG still image data by executing a JPEG compression process for still image data (YUV digital image data) obtained by the camera unit 105 and image processing unit 104 (the generated still image data is stored in the image data storage area 108*a* of the data storage unit 108), and a JPEG decoder for receiving still image data which has been JPEG-encoded by the still image codec unit 102 and stored in the data storage unit 108, and converting the received still image data into YUV digital still image data by a JPEG expansion process.

The moving image codec unit 103 includes an MPEG encoder for generating MPEG moving image data by executing an MPEG compression process for moving image data (YUV digital image data) obtained by the camera unit 105 and image processing unit 104 (the generated moving image data is stored in the image data storage area 108*a* of the data storage unit 108), and an MPEG decoder for receiving moving image data which has been MPEG-encoded by the moving image codec unit 103 and stored in the data storage unit 108, and converting the received moving image data into YUV digital moving image data by an MPEG expansion process.

The tablet control unit 109 executes drive control of the handwriting tablet 110, and control for converting various kinds of information input at the handwriting tablet 110 by pen touch into digital signals, and transferring them to the CPU 101.

The LCD control unit 111 executes a process for receiving YUV digital image data transferred from the image processing unit 104 or YUV digital image data which is obtained via the JPEG and MPEG expansion processes of an image file in the data storage unit 108, converting the received data into RGB digital signals, and outputting them to the display unit 112, or a process for similarly outputting RGB digital data stored in the VRAM 107c to the display unit 112. The display unit 112 is a display device for displaying an image, and is used to output a monitor image of a captured image as an electronic viewfinder upon capturing, to play back and display captured still and moving image data, to output a GUI window upon operation of an application, and so forth. In this embodiment, the display unit comprises a VGA (680×480 dots) TFT liquid crystal display device.

The shutter SW 113 is a shutter used to issue a start instruction of an image capture operation. The shutter SW 113 has two switch positions in correspondence with the depression pressures of the switch. Upon detection of the first position (low depression pressure: to be referred to as a "half-stroke position" hereinafter), camera setups such as white balance, AE, and the like are locked, and upon detection of the second position (high depression pressure: to be referred to as a "shutter-ON position" hereinafter), an image capture operation is executed.

The control key group 114 is a group of auxiliary keys that allow some simple control operations without limiting operations to pen inputs from the tablet during execution of an application, and includes, for example, cursor keys, scroll keys, a determination key, a cancel key, and the like.

The battery 116 is a rechargeable secondary battery or dry cell. The DC/DC converter 115 receives power supply from the battery 116, generates a plurality of power supply voltages via boost and regulation processes, and supplies required power supply voltages to elements such as the CPU 101 and the like. Voltage supply from the DC/DC converter 115 is controlled to start/stop in response to a control signal from the CPU 101.

The timer 117 is used to measure a moving image capture time. When the timer 117 is started after a timer value is set, it starts a timer count process. When the set timer value is reached, the timer 117 sends a time-out signal to the CPU 101.

Figure 2:
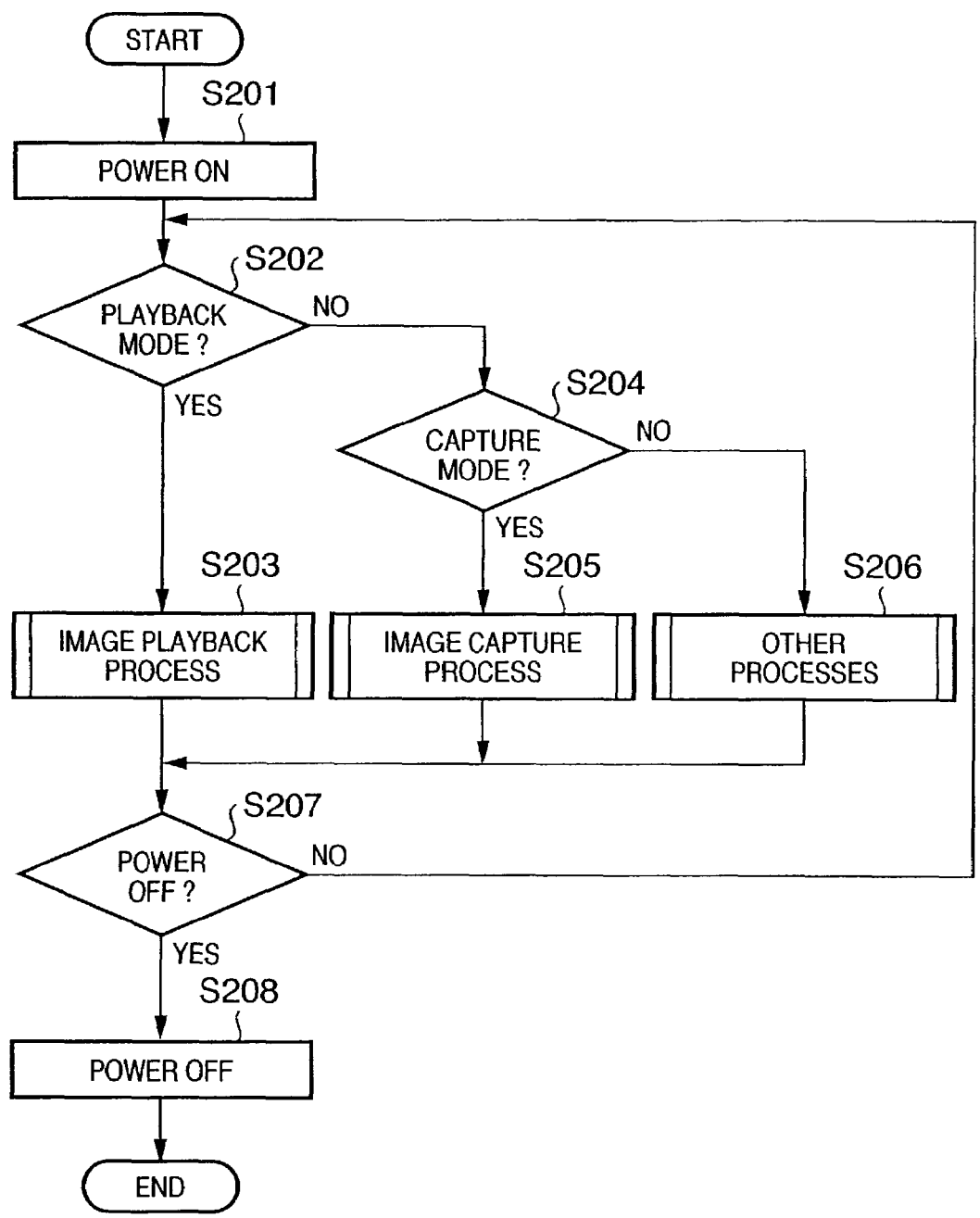
FIG. 2 is a flow chart of a main routine executed by the image processing apparatus in the first embodiment of the present invention.

The operation of the image processing apparatus of this embodiment with the aforementioned arrangement will be described below with reference to the flow chart shown in FIG. 2. FIG. 2 is a flow chart of a main routine executed by the image processing apparatus of this embodiment.

Referring to FIG. 2, when the power supply of the main body is turned on in step S201, it is checked in step S202 if the current mode is a playback mode. If YES in step S202, the flow advances to step S203 to execute a playback process of still and moving image data stored in the main body. Details of this playback process will be described later. If it is determined in step S202 that the current mode is not a playback mode, the flow advances to step S204 to check if the current mode is an image capture mode. If YES in step S204, a still or moving image capture process is executed by the internal camera module in step S205. Details of the image capture process will be described later. If it is determined in step S204 that the current mode is not an image capture mode, the flow advances to step S206 to execute other processes. The other processes include, e.g., processes of a management application such as system setups, environment setups, and the like of the image processing apparatus main body.

Upon completion of the process in step S203, S205, or S206, it is checked in step S207 if a power-OFF operation has been made. If YES in step S207, a power-OFF process is executed in step S208; otherwise, it is determined that a mode switching operation has been made, and the flow returns to step S202 to check if the playback mode is selected.

Figure 3:
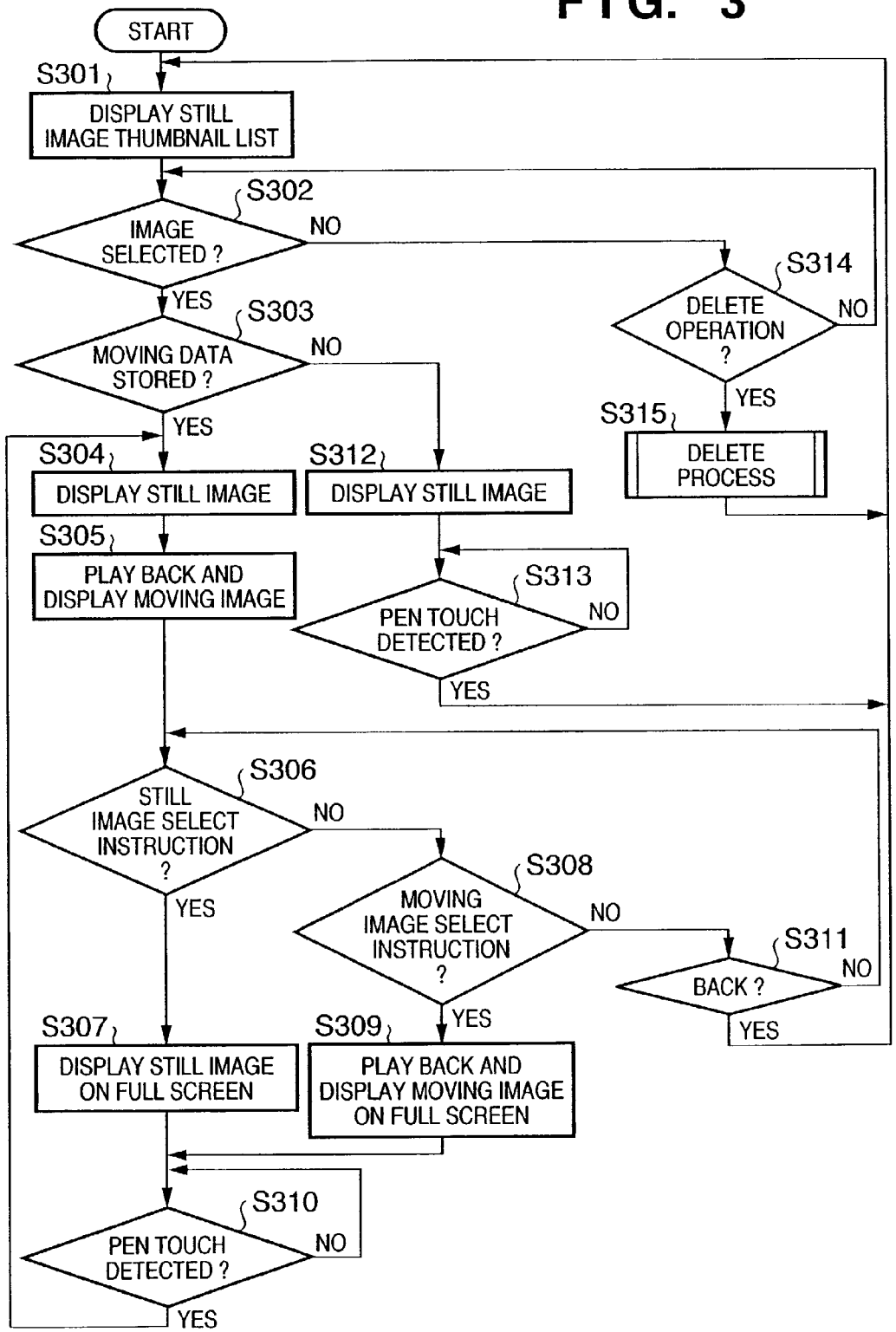
FIG. 3 is a flow chart showing details of a still image/moving image playback process in step S203.

The still/moving image playback process in step S203 will be explained in detail below using FIG. 3. FIG. 3 is a flow chart showing details of the process in step S203.

Referring to FIG. 3, a list of thumbnail image data corresponding to various still images stored in the data storage unit 108 is displayed in step S301, and the control waits until operator's operation is made. The thumbnail image data are generated by executing a reduction process of still image data to a thumbnail size (80×60 dots) and compressing the reduced data by JPEG. Details of a display example will be described later.

The operator can select an image by designating it by pen operation with respect to the tablet 110 integrated with the display unit 112, or by focus movement upon operation of the up, down, right, and left cursor keys and the determination key included in the control key group 114. If a given thumbnail image is selected in step S302, it is checked in step S303 if moving image data corresponding to the selected thumbnail image is present. Details of this check method will be described later. If a moving image is present, the flow advances to step S304.

In step S304, still image data corresponding to the selected thumbnail image is read out from the data storage unit 108, and undergoes a JPEG expansion process by the still image codec unit 102. The expanded still image data then undergoes a reduction process to a QVGA size (320×240 dots), and the reduced image data is displayed. Furthermore, in step S305, moving image data corresponding to the still image that has been selected and displayed is read out from the data storage unit 108, and undergoes an MPEG expansion process by the moving image codec unit 103. Furthermore, the expanded moving image data undergoes a reduction process to a QQVGA size (160×120 dots), and then undergoes a moving image playback process. That is, a still image display process and moving image display process are simultaneously done on a single window. Details of a display example of these images will be described later.

If it is determined in step S306 that the displayed still image data is designated by pen operation or cursor key operation, the flow advances to step S307. In step S307, this still image data is displayed to have a VGA size on the full screen. Likewise, if it is determined in step S308 that the moving image data, playback of which is underway, is designated, the moving image data is played back and displayed to have a VGA size on the full screen. If it is determined in step S310 that the screen in the playback/display state in step S307 or S308 is touched with a pen, the flow returns to the process for simultaneously playing back the still and moving images on the single window in step S304 and subsequent steps. If a "back" instruction is made by, e.g., pen touch operation in step S311, the flow returns to step S301 to display the list of thumbnail image data.

If it is determined in step S303 that moving image data corresponding to the selected image is not present, still image data corresponding to the selected image is read out from the data storage unit 108 and undergoes a JPEG expansion process by the still image codec unit 102, and the expanded still image data is then displayed to have a VGA size (640×480 dots) on the full screen in step S312. After that, if this screen is touched with a pen, the flow returns to step S301 to display the list of thumbnail image data.

If it is determined in step S302 that no image is selected, and if it is determined in step S314 that a delete operation is made, i.e., a delete button icon (to be described later) is touched with a pen, an image data delete process is executed in step S315.

Figure 4:
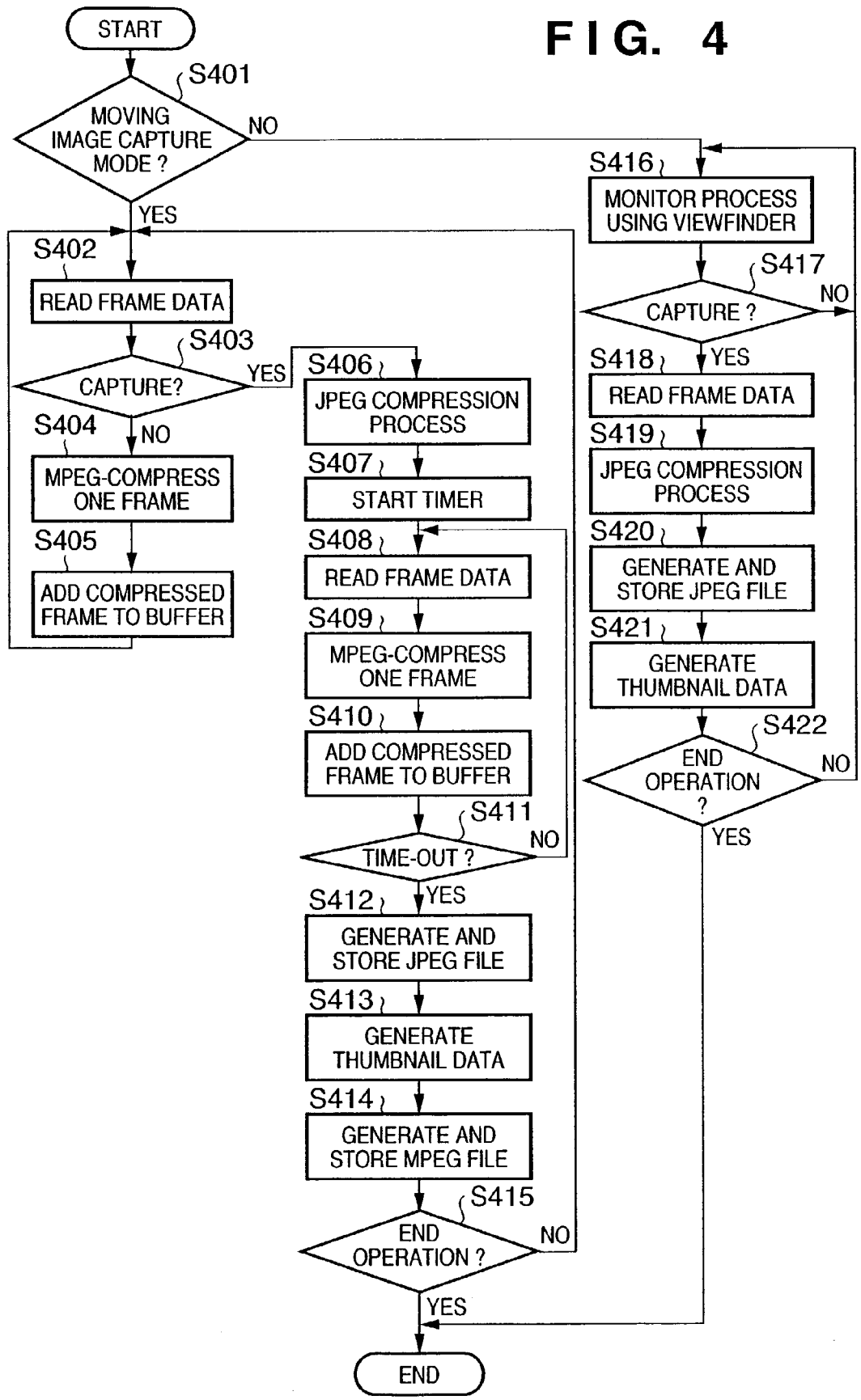
FIG. 4 is a flow chart showing details of a still image/moving image capture process in step S205.

The still/moving image capture process in step S205 will be described in detail below using FIG. 4. FIG. 4 is a flow chart showing details of the process in step S205.

Referring to FIG. 4, it is checked in step S401 if a moving image capture mode is selected. If YES in step S401, the flow advances to a moving image capture process in step S402 and subsequent steps. If NO in step S401, since it is determined that a normal still image capture mode is selected, the flow advances to a still image capture process in step S416 and subsequent steps. Note that the moving image capture mode is an operation mode for simultaneously capturing and recording a moving image for an arbitrary period of time before and after a still image capture timing upon capturing a still image.

In the moving image capture process, a process for fetching YUV digital image data for one frame, which is output from the camera unit 105 via the image processing unit 104, in the image rasterizing area 107a of the RAM 107 is executed in step S402. It is then checked in step S403 if a capture instruction is issued, i.e., the shutter SW 113 has been pressed (the shutter SW 113 is at the shutter-ON position). If YES in step S403, the flow advances to processes in step S406 and subsequent steps. On the other hand, if NO In step S403, the image data for one frame fetched in step S402 undergoes an MPEG compression process by the moving image codec unit 103 in step S404, and the MPEG-compressed data for one frame is temporarily stored in the moving image buffer 107d in step S405. The moving image buffer 107d is a ring buffer, and every time MPEG-compressed data for a new frame is generated, it is added in turn to the end position of the buffer. When the buffer becomes full of data, frame data is discarded in turn from the oldest one. The buffer size can arbitrarily vary in accordance with the setup of the moving image recording time.

If it is determined in step S403 that the capture instruction is issued, a still image capture process is executed, i.e., the image data for one frame fetched in step S402 undergoes a JPEG compression process by the still image codec unit 102 in step S406. In step S407, a timer value (moving image capture time) is set in the timer 117 to measure time, and the timer 117 is started. The timer value setting method is not particularly limited. For example, the timer value may be increased/decreased using the "right and left" cursor keys included in the control key group 114 (the increased/decreased value is displayed on the display unit 112), and may be set by pressing the determination key.

In step S408, a process for fetching YUV digital image data for one frame, which is output from the camera unit 105 via the image processing unit 104, in the image rasterizing area 107a of the RAM 107 is executed as in step S402. In step S409, the image data for one frame fetched in step S408 undergoes an MPEG compression process by the moving image codec unit 103 as in step S404. The MPEG-compressed data for one frame is additionally stored at the end position of the moving image buffer 107d in step S410. It is then checked in step S411 if the timer 117 started in step S407 has reached a time-out. If NO in step S411, i.e., the moving image capture time still remains, the flow returns to step S408 to repeat the MPEG compression process of frame data.

If it is determined in step S411 that the timer 117 has reached a time-out, a process for appending data such as a predetermined JPEG header and the like to the data JPEG-compressed in step S406, and saving that data as a JPEG file in the image data storage area 108a is executed in step S412. At the same time, the captured still image data undergoes a reduction process and also a JPEG compression process to generate thumbnail data, and that thumbnail data is similarly stored as a JPEG file in the image data storage area 108a in step S413. In step S414, a process for appending data such as a predetermined MPEG header and the like to MPEG-compressed data for a plurality of frames, which are stored in steps S405 and S410, and storing the data as an MPEG file in the image data storage area 108a is executed. These JPEG and MPEG files are saved to have the same file names with extensions ".JPG" and ".MP4". With the aforementioned processing flow, a JPEG still image file and an MPEG moving image file for an arbitrary period of time before and after that still image are generated in association with each other using the same file name.

Also, information of the file name of still image data used to generate given thumbnail data is appended to that thumbnail data (process in step S413). In this manner, if a thumbnail image is selected in step S303, since the file name of still image data (moving image data) can be specified by referring to the information appended to the selected thumbnail image data, it can be checked if moving image data having the same file name as the specified file name is present. In the following description, this method is used when still or moving image data corresponding to thumbnail data is specified or the presence of such still or moving image data is checked.

If it is determined in step S415 that the operator has made end operation (for example, when a "back to main window" icon is provided on the window, and the operator touches this icon with a pen), the image capture process ends. If no end operation is made, the flow returns to step S402 to restart the frame data read process.

On the other hand, if it is determined in step S401 that the moving image capture mode is not selected, a process for continuously outputting YUV digital image data, which is output from the camera unit 105 via the image processing unit 104, to the display unit 112 is executed in step S416, i.e., an image to be captured is monitor-displayed on the electronic viewfinder. It is then checked in step S417 if a capture instruction is issued, i.e., the shutter SW 113 has been pressed (the shutter SW 113 is at the shutter-ON position). If YES in step S417, a still image capture process is executed in step S418. That is, a process for storing image data for one frame, which is displayed on the display unit 112 at the time of depression of the shutter SW 113, in the image rasterizing area 107a of the RAM 107 is executed. The image data for one frame, which is stored in the image rasterizing area 107a, undergoes a JPEG compression process by the still image codec unit 102 in step S419. In step S420, the JPEG-compressed data for one frame is stored in the image data storage unit 108 by generating a JPEG file as described above. In step S421, the captured still image data undergoes a reduction process and also a JPEG compression process to generate thumbnail data, and that thumbnail data is similarly saved in the image data storage area 108a as a JPEG file. At this time, information of the file name of the still image data is appended to the thumbnail data. If the operator has made end operation in step S422, the image capture process ends. If no end operation is made, the flow returns to step S416 to restart the monitor process using the electronic viewfinder.

Figure 5:
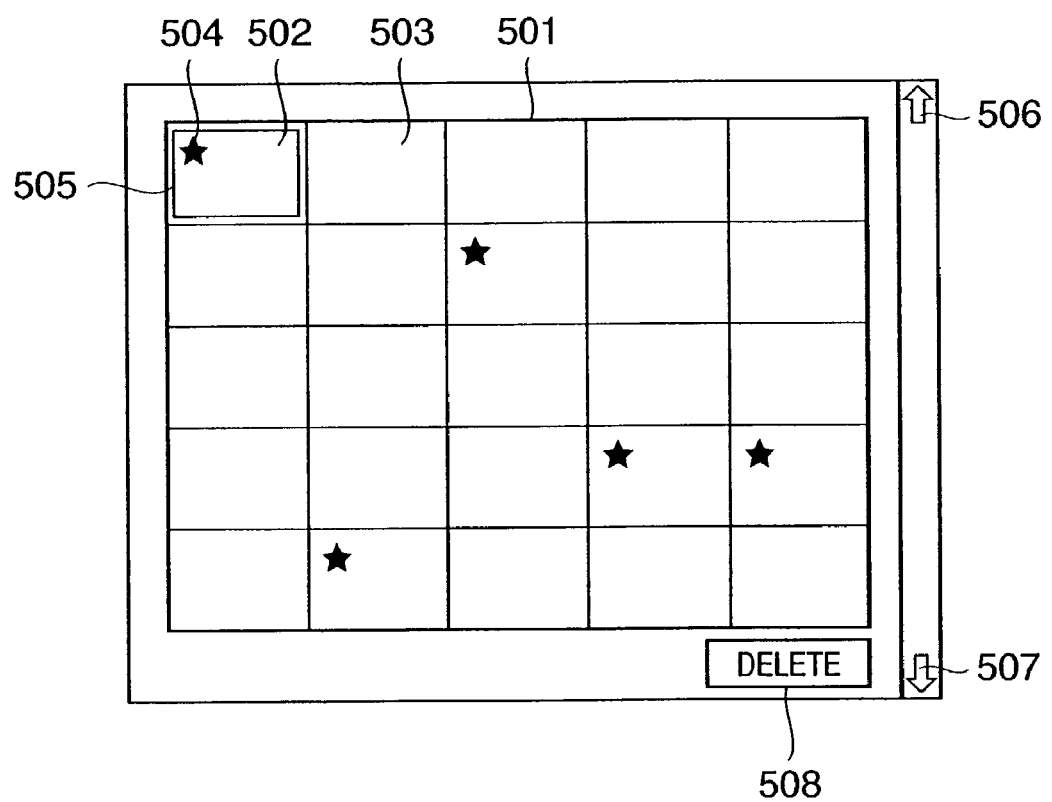
FIG. 5 shows a window display example of a thumbnail image data list in step S301.

FIG. 5 shows a window display example of the thumbnail image data list in step S301. The window shown in FIG. 5 is displayed on the display unit 112. These thumbnail image data are thumbnail still images corresponding to various still images stored in the data storage unit 108, and are JPEG-compressed data of reduced-scale images of 80×60 dots. These data are generated during the still image capture process, and are stored in the data storage unit 108, as has been explained above using FIG. 4.

Referring to FIG. 5, reference numeral 501 denotes a thumbnail image list display area on which thumbnail still image data corresponding to respective still images are displayed in a matrix in ascending order of date of creation (the present invention is not limited to such specific order). On this display area, reference numeral 502 denotes an area where thumbnail image data which corresponds to still image data having moving image data (moving image data having the same file name although it has a different extension) is displayed, and a mark 504 indicating that an objective image has moving image data is superimposed. However, a method of indicating a still image having a moving image is not limited to such specific method using the mark shown in FIG. 5.

Reference numeral 503 denotes an area where thumbnail image data corresponding to data of only still image data is displayed. Since an objective image does not have any moving image, no mark is displayed. The operator can easily determine if data corresponding to a thumbnail image is still image data having moving image by checking if this mark 504 is displayed.

Reference numeral 505 denotes a focus display which indicates that one thumbnail image data is designated. This focus display can be arbitrarily moved in the upper, lower, right, and left directions by operating the up, down, right, and left cursor keys included in the control key group 114, and a focused thumbnail image can be selected by focusing a given thumbnail image and pressing the determination key or touching the focused thumbnail image area with a pen. Or a thumbnail image can be similarly selected by double-touching an area on which an arbitrary thumbnail image is displayed on the display window.

Reference numerals 506 and 507 denote arrow icons used to respectively instruct up and down scroll operations. When the thumbnail image data list cannot fall within one window, it scrolls up or down when the operator touches one of these arrows with a pen.

Reference numeral 508 denotes a delete button icon. When the operator touches this icon with a pen, the selected image (focused image) is deleted.

Figure 6:
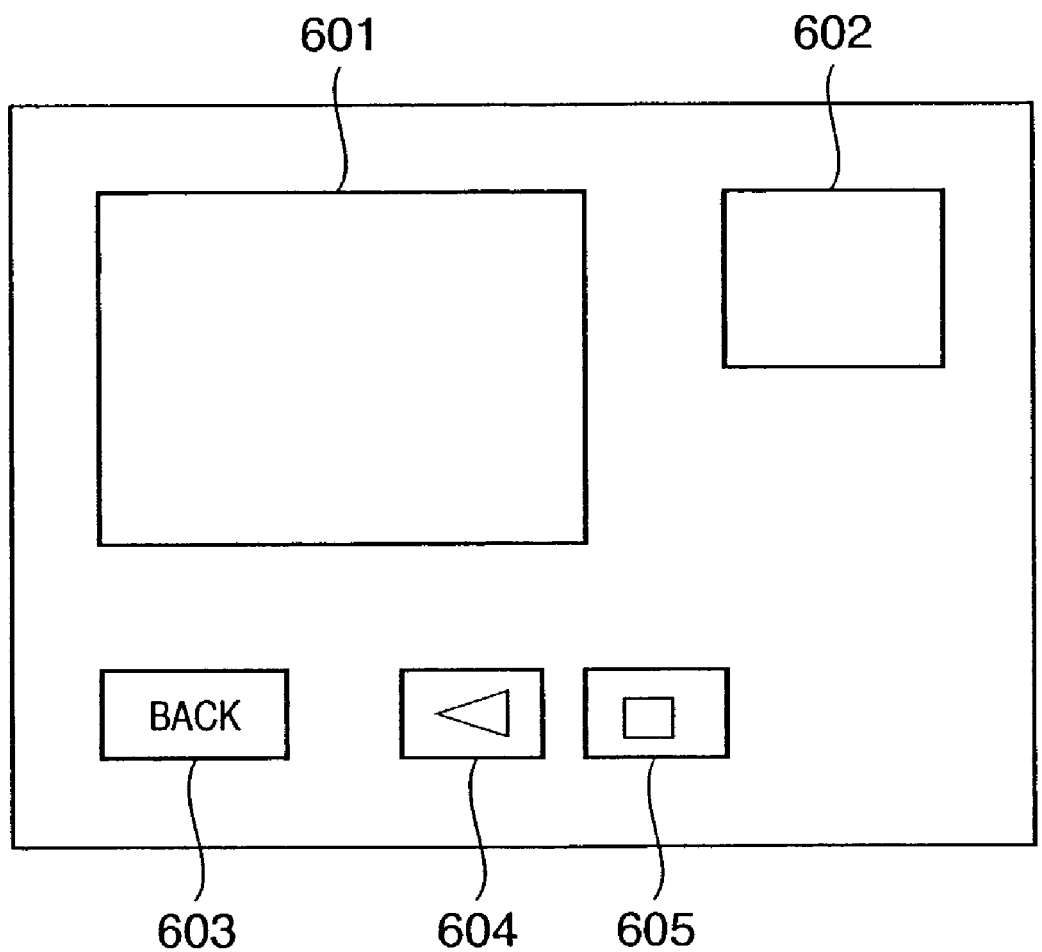
FIG. 6 shows a window display example when a thumbnail image corresponding to still image data having moving image is selected from the thumbnail image list shown in FIG. 5.

FIG. 6 shows a window display example when a thumbnail image corresponding to still image data having moving image data is selected from the thumbnail image list shown in FIG. 5. The window shown in FIG. 6 is displayed on the display unit 112.

Referring to FIG. 6, reference numeral 601 denotes a still image display area. Still image data corresponding to the selected thumbnail image is read out and undergoes a JPEG expansion process and reduction process in turn, and the processed image is displayed on this area with a QVGA size (320×240 dots). Also, reference numeral 602 denotes an area on which moving image data corresponding to the still image data is played back and displayed. Objective moving image data is read out and undergoes an MPEG expansion process and reduction process in turn, and the processed moving image is continuously played back and displayed on this area with a QQVGA size (160×120 dots).

Reference numeral 603 denotes a display area of a "back" icon. When the operator touches this icon with a pen, the thumbnail list shown in FIG. 5 is displayed again. Reference numeral 604 denotes a display area of a play button icon. When the operator touches this icon with a pen, moving image playback starts. Furthermore, reference numeral 605 denotes a display area of a stop button icon. When the operator touches this icon with a pen, moving image playback stops.

On this window, when the operator touches the still image display area 601 with a pen, still image data is displayed to have a VGA size (640×480 dots) on the full screen. When the operator touches the moving image display area 602 with a pen, moving image data is played back and displayed with an originally recorded moving image size.

In this embodiment, JPEG- and MPEG4-compressed digital data have been exemplified as still and moving images. However, the same effects as in the above embodiment can be obtained if other still and moving image compression schemes or non-compressed data are used. For example, various formats such as RGB bitmap data, GIF-compressed data, PING-compressed data, and the like may be used as a still image, and MPEG1- or MPEG2-compressed data with a higher compression ratio than a still image and the like may be used as a moving image.

In this embodiment, pen operations on the handwriting tablet have been exemplified as operations for executing an application. However, the present invention is not limited to such specific operations, but key operations may be used. For example, as a user interface upon designating and selecting a thumbnail image, a focus frame may be moved by the up, down, right, or left cursor key to switch a thumbnail image to be selected, and the selected thumbnail image data may be designated by the determination key.

Second Embodiment

The first embodiment uses JPEG compression as a compression scheme of still image data, and MPEG compression with a higher compression ratio than JPEG as a compression scheme of moving image data. However, the present invention is not limited to such specific schemes. In order to reduce the storage file size of moving image data, a method of reducing the size of an image may be used in place of the method of increasing the compression ratio by lowering image quality. In this embodiment, an image undergoes a reduction process by decimating pixels upon fetching frame data, and the reduced image then undergoes a moving image compression process.

Figure 7:
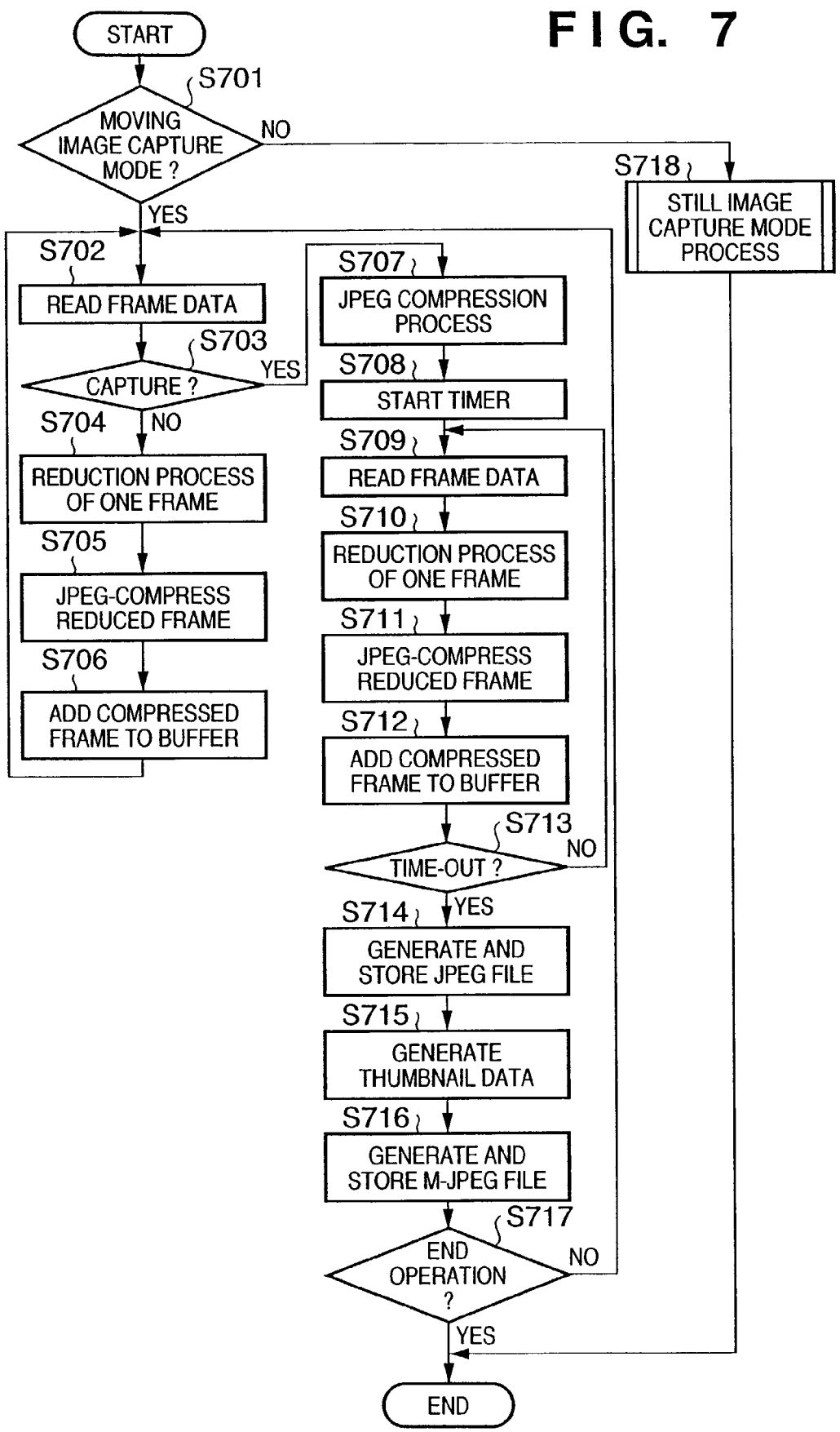
FIG. 7 is a flow chart showing details of still image/moving image capture process according to the second embodiment of the present invention.

FIG. 7 is a flow chart showing details of the still/moving image data capture process in this embodiment.

Referring to FIG. 7, the processes in steps S701, S702, and S703 are the same as those in steps S401, S402, and S403. If it is determined in step S703 that a capture instruction is issued, the flow advances to processes in step S707 and subsequent steps. On the other hand, if no capture instruction is issued, a process for converting image data for one frame fetched in step S702 into image data of a QQVGA size (160× 120 dots) via a reduction process is executed in step S704. The reduced image data undergoes a JPEG compression process by the still image codec unit 102 in step S705. The JPEG-compressed data for one frame is temporarily stored in the moving image buffer 107d in step S706.

If it is determined in step S703 that the capture instruction is issued, a still image capture process is executed, i.e., the image data for one frame fetched in step S702 undergoes a JPEG compression process by the still image codec unit 102 in step S707. In step S708, a timer value (moving image capture time) is set in the timer 117 to measure time, and the timer 117 is started.

In step S709, a process for fetching YUV digital image data for one frame, which is output from the camera unit 105 via the image processing unit 104, in the image rasterizing area 107a of the RAM 107 is executed as in step S702. In step S710, a process for converting image data for one frame fetched in step S709 into image data of a QQVGA size (160× 120 dots) via a reduction process is executed as in step S704. The reduced image data undergoes a JPEG compression process by the still image codec unit 102 in step S711, and the JPEG-compressed data for one frame is additionally stored at the end position of the moving image buffer 107d in step S712. It is then checked in step S713 if the timer 117 started in step S708 has reached a time-out. If NO in step S713, i.e., the moving image capture time still remains, the flow returns to step S709 to repeat the JPEG compression process of frame data.

If it is determined in step S713 that the timer 117 has reached a time-out, a process for appending data such as a predetermined JPEG header and the like to the data JPEG-compressed in step S707, and saving that data as a JPEG file in the image data storage area 108a is executed in step S714. At the same time, the captured still image data undergoes a reduction process and also a JPEG compression process to generate thumbnail data in step S715, and that thumbnail data is similarly stored as a JPEG file in the image data storage area 108a. In step S716, a process for appending a predetermined JPEG header, data associated with a file format, and the like to JPEG-compressed data for a plurality of frames, which are stored in steps S706 and S712, and similarly storing the data as a Motion-JPEG (to be referred to as M-JPEG hereinafter) file in the image data storage area 108a is executed. These JPEG and M-JPEG files are saved to have the same file names with extensions ".JPG" and ".MJPG". With the aforementioned processing flow, one JPEG still image file and an M-JPEG moving image file for an arbitrary period of time before and after that still image are generated in association with each other using the same file name.

As in the first embodiment, information of the file name of still image data used to generate given thumbnail data is appended to that thumbnail data. In this manner, if a thumbnail image is selected, since the file name of moving image data can be specified by referring to the information appended to the selected thumbnail image data, it can be checked if moving image data having the same file name as the specified file name is present.

If it is determined in step S717 that the operator has made end operation, as in step S415, the image capture process ends. If no end operation is made, the flow returns to step S702 to restart the frame data read process.

If it is determined in step S701 that the moving image capture mode is not selected, a normal still image capture process is executed in step S718. The processing contents are the same as those in step S416 to S422.

Third Embodiment

In this embodiment, a process upon operation of a delete icon (a process in step S315) will be explained.

Figure 8:
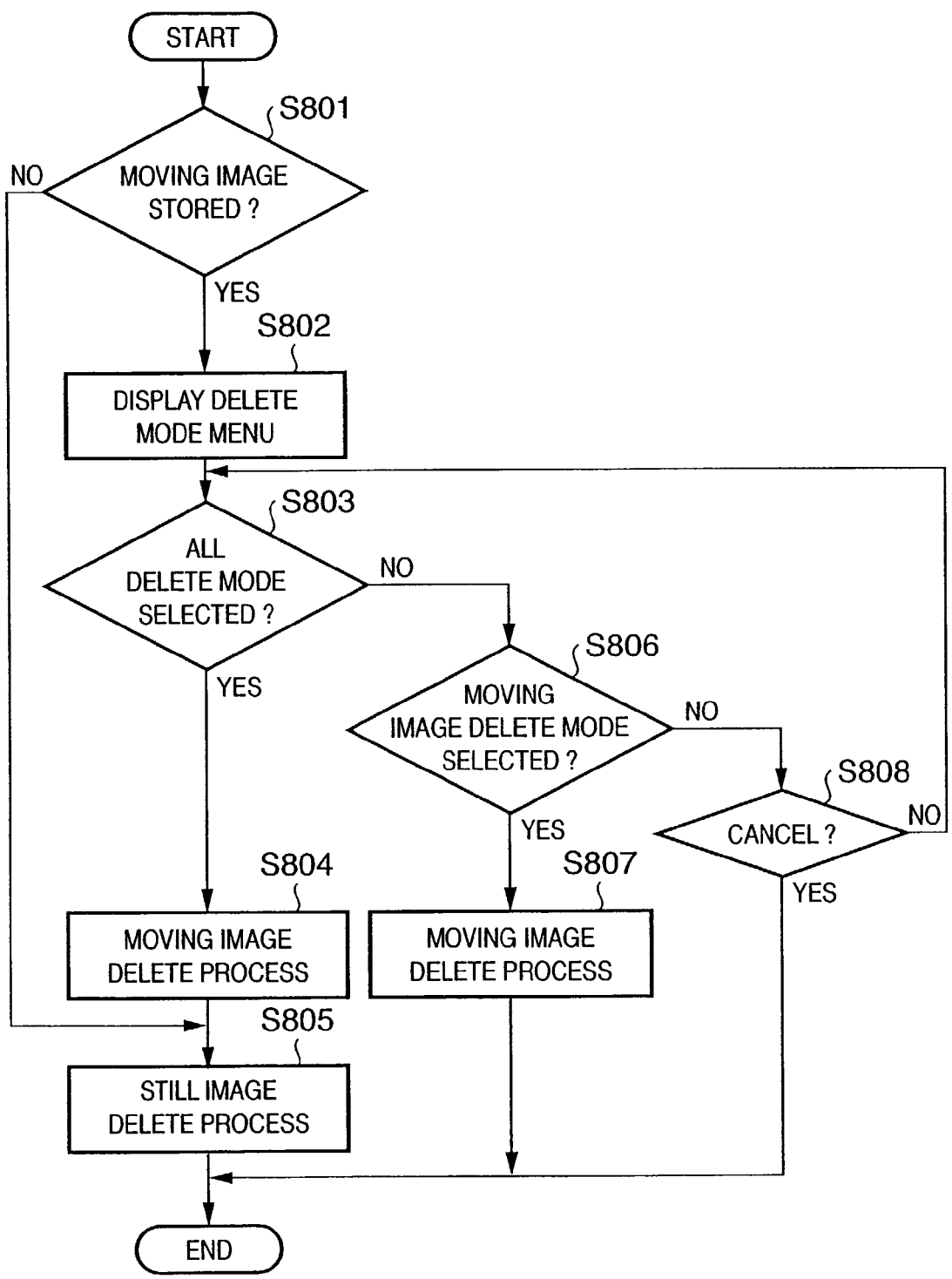
FIG. 8 is a flow chart showing details of a delete process in step S315.

FIG. 8 is a flow chart showing details of the delete process in step S315. Referring to FIG. 8, it is checked in step S801 if moving image corresponding to the thumbnail image data which is designated by the delete button is present. As the check method, the file name is specified by referring to the information appended to the designated thumbnail data, and it is checked if moving image data with the specified file name is present, as in the first embodiment.

If moving image data is present, a delete mode selection menu is displayed in step S802. The delete mode includes two modes, i.e., "all delete mode" of deleting all of moving and still image data, and "moving image delete mode" of deleting moving image data alone, and these modes are displayed as a menu. If the all delete mode is selected in step S803, a moving image data file corresponding to the designated thumbnail image data is read out, and its delete process is executed in step S804. Subsequently, a still image data file associated with that moving image data (a file having the same file name with an extension ".JPG") is read out, and its delete process is executed in step S805. Also, information appended to the thumbnail image data corresponding to the deleted moving and still image data is also deleted, thus ending the process.

If the all delete mode is not selected in step S803, it is checked in step S806 if the moving image delete mode is selected. If YES in step S806, the delete process of a moving image data file is executed in step S807, as in step S804, thus ending the process. On the other hand, if the moving image delete mode is not selected in step S806, it is checked in step S808 if a delete cancel operation has been made. If YES in step S808, the delete process ends; otherwise, the flow returns to step S803 to wait for the next operator's action. If no moving image data is found in step S801, a still image data file is read out, and its delete process is executed in step S805, thus ending the process.

Fourth Embodiment

In the first to third embodiments, the thumbnail image data list shown in FIG. 5 displays only thumbnail images corresponding to still image data as a list.

In this embodiment, the thumbnail image data list can display thumbnail images of still image data and those of given frames of moving image data as a list.

Figure 9:
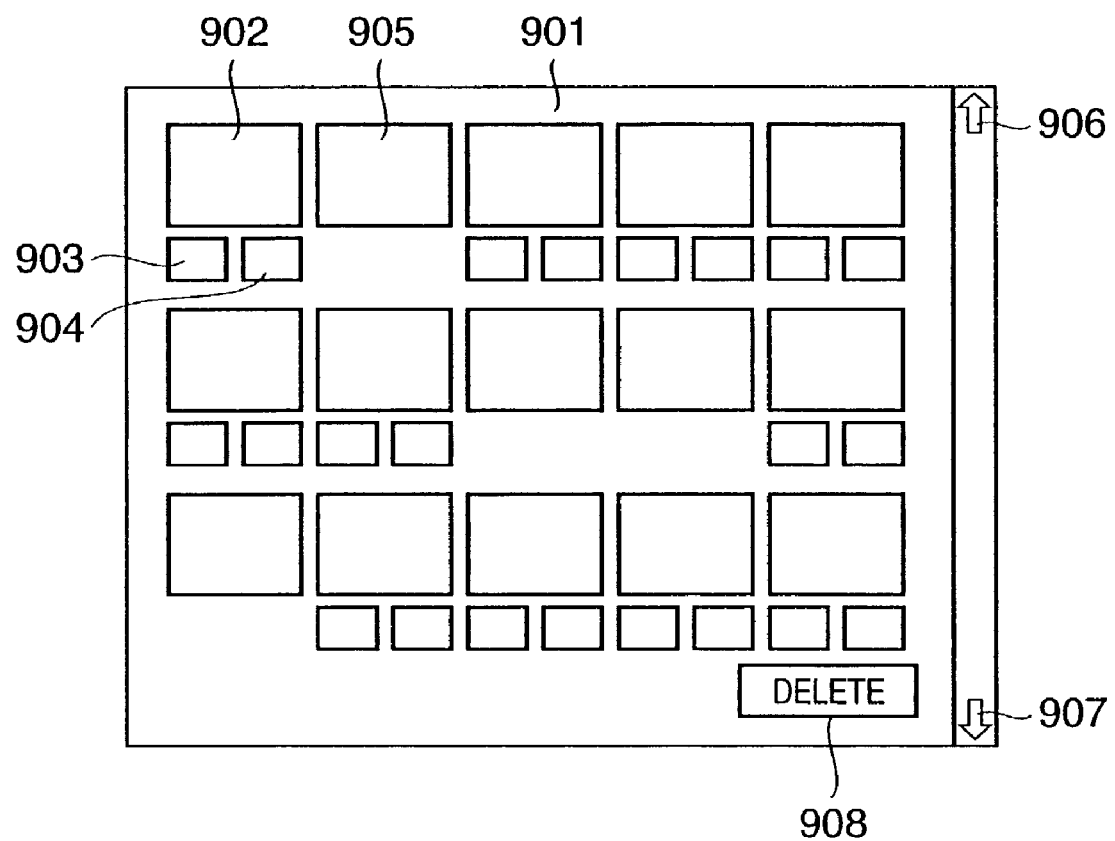
FIG. 9 shows a window display example of a thumbnail image data list according to the fourth embodiment of the present invention.

FIG. 9 shows a window display example of a thumbnail image data list of this embodiment. These thumbnail image data are thumbnail images corresponding to various still images and those corresponding to moving images, which are stored in the data storage unit 108. These data are simultaneously generated during the still image capture process, and are stored in the data storage unit 108, as has been described using FIG. 4. As for moving image thumbnail data, each moving image data stored in the data storage unit 108 is read out and a predetermined frame of the readout data undergoes a reduction process, and the reduced frame data is displayed as still image thumbnail data upon displaying thumbnail data.

Referring to FIG. 9, reference numeral 901 denotes a thumbnail image list display area on which thumbnail still image data of still and moving image data are displayed in a matrix in ascending order of date of creation. On this display area, reference numeral 902 denotes an area on which thumbnail data corresponding to still image data is displayed, and which has a thumbnail size of 120×90 dots. Reference numerals 903 and 904 denote areas on which thumbnail data corresponding to moving image data are displayed. The area 903 displays thumbnail data corresponding to the first frame of a moving image, and the area 904 displays thumbnail data corresponding to the last frame of the moving image. However, the frames to be displayed are not limited to these specific frames, and thumbnail data of arbitrary frames may be displayed. Thumbnail data of a moving image frame has a thumbnail size of 60×45 dots. Reference numeral 905 denotes an area on which only a still image thumbnail is displayed, and this area indicates that this data has no moving image data.

Reference numerals 906 and 907 denote arrow icons used to respectively instruct up and down scroll operations. When the thumbnail image data list cannot fall within one window, it scrolls up or down when the operator touches one of these arrows with a pen.

Reference numeral 908 denotes a delete button icon. When the operator touches this icon with a pen, the selected image is deleted.

Fifth Embodiment

In the first to fourth embodiments, still and moving image data are associated by forming files with the same file name but different extensions. However, association between captured data is not limited to this. For example, captured data may be associated by generating a management file or the like that describes association between files which are saved with different names. FIG. 10 shows an example of the format of such management file. In FIG. 10, still and moving image data files described in a single row are associated ones. Also, a method of multiplexing still and moving image data, and saving the multiplexed data in a single file may be used.

In the first to fourth embodiments, still and moving image data corresponding to selected thumbnail data are specified by appending the file name of still and moving image data to the thumbnail data. However, the present invention is not limited to such specific method. That is, the aforementioned management file may contain this thumbnail data to associate the thumbnail data, still image data, and moving image data with each other. More specifically, in the format of the management file shown in FIG. 10, the file name of a thumbnail image may be described in the same row as that of a corresponding still or moving image data file. Also, thumbnail data, still image data, and moving image data may be multiplexed in a single file, as described above.

Note that a process for generating the management file or multiplexing thumbnail data, still image data, and moving image data in a single file is executed by the CPU 101.

The present invention is not limited to the above embodiments and various changes and modifications can be made within the spirit and scope of the present invention. Therefore to apprise the public of the scope of the present invention, the following claims are made.

Other Embodiments

Furthermore, the invention is not limited only to the device and method for realizing the embodiments above, but a case also falls within the scope of the invention where a program code for software to realize the embodiments above is provided to a computer (CPU or MPU) in a system or device, and the computer of the system or device causes the various devices to operate in accordance with the program code so that the embodiments can be realized.

In this case, the program code itself for software will realize the features of the embodiments, thus the program code itself and the means for supplying the code to a computer, specifically, a storage medium with the program code stored on it, are included within the scope of the invention.

The storage medium for storing such a program code may include Floppy® disk, hard disk, optical disk, magneto-optical disk, CD-ROM, magnetic tape, nonvolatile memory card, ROM and so on.

In addition, such a program code is included within the scope of the invention not only in the case where a computer controls various devices only in accordance with supplied program code to realize the features of the embodiments, but also in the case where the program code realizes the embodiments in conjunction with an OS (operating system) or other application software running on a computer.

Also, a case is included within the scope of the invention where after the supplied program code has been stored in memory provided on a feature expansion board of a computer or a feature expansion unit connected to a computer, the CPU or the like on the feature expansion board or unit executes some or all of the actual processing based on the designation of the code to realize the embodiments.

As has been described, it is possible to reproduce moving image, still image, and thumbnail image in association with each other at once, since the still image (frame image), thumbnail image of the still image and moving images corresponding to the still image in association with each other can be held according to the present invention.

By the reproduction processing, search of moving image data that is asked by someone can also be done at once.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
a capturing unit configured to capture a moving image to acquire successive frame images;
a control unit configured to control a buffer memory to record each frame image acquired by said capturing unit into the buffer memory so that the buffer memory temporarily holds frame images;
a reception unit configured to receive a designation of capturing a still image, during capturing the movie image by said capturing unit;
a first recording unit configured to record, in a memory as a still image file, a frame image which is captured by said capturing unit at a first time when the designation is received;
a second recording unit configured to record, in the memory as a movie file, while associating with the still image file, frame images which are captured by said capturing unit during a predetermined period of time before the first time when the designation is received and are held in the buffer memory; and
a third recording unit configured to record, in the memory as a movie file, while associating with the still image file, frame images which are captured by said capturing unit after the first time when the designation is received until a predetermined time elapses after the first time and are held in the buffer memory,
wherein, when a still image capturing mode is set, said first recording unit operates in accordance with a designation of capturing a still image and said second and third recording units do not operate, and
when a movie capturing mode is set, said first, second, and third recording units operate in accordance with a designation of capturing a still image.

2. The apparatus according to claim 1, wherein said capturing unit comprises:
a moving image compression unit configured to compress each frame image of the moving image.

3. The apparatus according to claim 2, wherein said moving image compression unit executes an MPEG compression process for each frame image of the moving image.

4. The apparatus according to claim 1, wherein said capturing unit comprises:

a moving image reduction/compression unit configured to reduce a size of each frame image of the moving image captured by said capturing unit, and compressing the reduced frame image.

5. The apparatus according to claim 4, wherein said moving image reduction/compression unit reduces the size of each frame image of the moving image captured by said capturing unit by decimating pixels of the frame image, and executes a JPEG compression process for the reduced frame image.

6. The apparatus according to claim 1, wherein:
said first recording unit compresses the frame image which is captured by said capturing unit at the first time, and then records the compressed frame image in the memory as the still image file.

7. The apparatus according to claim 6, wherein said first recording unit executes JPEG compression for the frame image which is captured by said capturing unit at the first time, and then records the JPEG compressed frame image in the memory as the still image file.

8. The apparatus according to claim 1, wherein the movie file is an MPEG file.

9. The apparatus according to claim 1, wherein the movie file is a Motion-JPEG file.

10. The apparatus according to claim 1, wherein the still image file is a JPEG file.

11. The apparatus according to claim 1, wherein said first recording unit, said second recording unit, and said third recording unit associate the movie files and the still image file with each other by appending the same file names.

12. The apparatus according to claim 1, further comprising:
a management file generation unit configured to generate a management file that describes an association between the files generated by said first, second, and third recording units,
wherein the management file associates the files generated by said first, second, and third recording units with each other.

13. The apparatus according to claim 1, further comprising:
a multiplexing unit configured to multiplex the files generated by said first, second, and third recording units to form a single file.

14. The apparatus according to claim 1, wherein when a data size of the frame images to be held in the memory exceeds a saving capacity of the memory, said control unit discards a frame image in turn from one with the oldest save timing of the saved frame images.

15. An image processing method comprising the steps of:
capturing a moving image to acquire successive frame images;
controlling a buffer memory to record each frame image acquired by said capturing step into the buffer memory so that the buffer memory temporarily holds frame images;
receiving a designation of capturing a still image, during capturing of the movie image by said capturing step;
recording, with a first recording unit, in a memory as the still image file, a frame image which is captured by said capturing step at a first time when the designation is received;
recording, with a second recording unit, in the memory as a movie file, while associating with the still image file, frame images which are captured by said capturing step during a predetermined period of time before the first time when the designation is received and are held in the buffer memory; and
recording, with a third recording unit, in the memory as a movie file, while associating with the still image file, frame images which are captured by said capturing step after the first time when the designation is received until a predetermined time elapses after the first time and are held in the buffer memory,
wherein, when a still image capturing mode is set, the first recording unit operates in accordance with a designation of capturing a still image and the second and third recording units do not operate, and
when a movie capturing mode is set, the first, second, and third recording units operate in accordance with a designation of capturing a still image.

16. A computer program stored in a computer-readable storage medium for making a computer execute an image processing method of claim 15.

17. The apparatus according to claim 1, further comprising a user-operable unit that designates the predetermined time.

18. An image processing apparatus comprising:
a capturing unit configured to capture a moving image to acquire successive frame images;
a control unit configured to control a buffer memory to record each frame image acquired by said capturing unit into the buffer memory so that the buffer memory temporary holds frame images;
a reception unit configured to receive a designation of capturing a still image, during capturing the movie image by said capturing unit;
a first recording unit configured to record, in a memory as a still image file, a frame image which is captured by said capturing unit at a first time when the designation is received;
a second recording unit configured to record, in the memory as a movie file, while associating with the still image file, a predetermined number of frame images which are captured by said capturing unit before the first time when the designation is received and are held in the buffer memory; and
a third recording unit configured to record, in the memory as a movie file, while associating with the still image file, a predetermined number of frame images which are captured by said capturing unit after the first time when the designation is received and are held in the buffer memory,
wherein, when a still image capturing mode is set, said first recording unit operates in accordance with a designation of capturing a still image and said second and third recording units do not operate, and
when a movie capturing mode is set, said first, second, and third recording units operate in accordance with a designation of capturing a still image.

19. An image processing method comprising the steps of:
capturing a moving image to acquire successive frame images;
controlling a buffer memory to record each frame image acquired by said capturing step into the buffer memory so that the buffer memory temporary holds frame images;
receiving a designation of capturing a still image, during capturing the movie image by said capturing step;
recording, with a first recording unit, in a memory as a still image file, a frame image which is captured by said capturing step at a first time when the designation is received;

recording, with a second recording unit, in the memory as a movie file, while associating with the still image file, a predetermined number of frame images which are captured by said capturing step before the first time when the designation is received and are held in the buffer memory; and recording, with a third recording unit, in the memory as a movie file, while associating with the still image file, a predetermined number of frame images which are captured by said capturing step after the first time when the designation is received and are held in the buffer memory, wherein, when a still image capturing mode is set, the first recording unit operates in accordance with a designation of capturing a still image and the second and third recording units do not operate, and when a movie capturing mode is set, the first, second, and third recording units operate in accordance with a designation of capturing a still image.

* * * * *